US007688980B2

(12) United States Patent
Kean et al.

(10) Patent No.: US 7,688,980 B2
(45) Date of Patent: Mar. 30, 2010

(54) CRYPTOGRAPHIC-KEY GENERATION AND MANAGEMENT

(75) Inventors: Brian Kean, Missouri Valley, IA (US); Kristi White, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1501 days.

(21) Appl. No.: 11/005,880

(22) Filed: Dec. 6, 2004

(65) Prior Publication Data
US 2006/0120532 A1    Jun. 8, 2006

(51) Int. Cl.
*H04L 9/00* (2006.01)
(52) U.S. Cl. .................. 380/277; 380/44; 380/278; 380/280; 713/168; 713/171; 726/2; 726/27
(58) Field of Classification Search ............... 380/44, 380/277, 278, 280; 726/2, 27; 713/168, 713/171
See application file for complete search history.

(56) References Cited

U.S. PATENT DOCUMENTS 6,606,387 B1 *   8/2003   Abraham .................... 380/277

2003/0187798 A1 *   10/2003   McKinley et al. ............. 705/50

OTHER PUBLICATIONS

Zaxus Host Security Module RG7000 Oeprations and Installations Manual 1270A513 Issue 3, Zaxus Limited, Copyright 1987-2000, downloaded from http://cryptome.org/gag/HSM_Programmers_Manual_-1270A514-3.pdf.

* cited by examiner

*Primary Examiner*—Kimyen Vu
*Assistant Examiner*—Baotran N To
(74) *Attorney, Agent, or Firm*—Townsend and Townsend and Crew, LLP

(57) ABSTRACT

Methods and systems are provided of managing a cryptographic key. A first key component is received from a first key custodian. A second key component is received from a second key custodian. A key operation is performed on the first and second key components to generate the cryptographic key. A cryptographic-key number is assigned to the cryptographic key. A key form is printed specifying the cryptographic key. An association is recorded between the cryptographic-key number and an electromagnetic tag identifier coupled physically with the key form.

4 Claims, 4 Drawing Sheets

CRYPTOGRAPHIC-KEY GENERATION AND MANAGEMENT

BACKGROUND OF THE INVENTION

This application relates generally to cryptographic keys. More specifically this application relates to methods and systems for generating and managing cryptographic keys.

The use of cryptography has been escalating. While there has always been a need to maintain information securely, particularly when information is moved to different places or among different people, this need has been increasing as a consequence of increased electronic interaction. The security of email, virtual private networks ("VPNs"), electronic commerce, credit-card transactions, medical information, and national-defense and military secrets, to identify just a few types of information, currently relies on the encryption of information to provide confidentiality, authentication, and access control. The management of encrypted information depends critically on the management of the cryptographic keys used to encrypt and decrypt the information. The escalating use of cryptography by a wide spectrum of institutions has resulted in a concomitant increase is the need to manage and protect large numbers of cryptographic keys.

Cryptographic keys are vulnerable to a variety of different types of attacks, some of which may be carried out in a sophisticated fashion by a savvy hacker, and others of which may be carried out in a remarkably simple way by disgruntled employees. For example, keys may be compromised by simply duplicating a key, with an attacker using the copied key to access and steal information; in many instances, this type of attack may be perpetuated with the legitimate party never knowing that the information has been compromised. An attacker may substitute a key by inserting a fake key that provides the attacker with control over information, and removes control over the information from the legitimate party. An attacker may also sometimes just destroy or corrupt a key; this type of attack is more common for widely used services and is used to undermine confidence in the system by forcing the system to suspend services while the integrity of the information is restored.

Current systems for generating and managing cryptographic keys often have a significant manual component. For example, in one system, key generation may require the involvement of multiple key custodians so that no single person has access to the keys. Each custodian generates a portion of the key, interacting through a keyboard with a host security module of the type well known in the art. The key portion is transcribed by hand onto one or more key forms, with the completed key forms being secured within a secure storage device after being labeled with a key number that identifies the generated key. The manual component of such a process introduces a significant risk of errors, including the possibility of transcription errors, the use of unclear handwriting, accidental use of a production key as a test key, mislabeling of the key forms, and the like.

Because of how damaging the consequences of such errors may be and because of the increasing use and reliance on cryptographic keys, there is a general need for improved methods and systems of generating and managing cryptographic keys.

BRIEF SUMMARY OF THE INVENTION

Embodiments of the invention methods and devices that simplify cryptographic key generation and management. In one set of embodiments, a method is provided of managing a cryptographic key. A cryptographic-key number is assigned to the cryptographic key. A key form is printed specifying the cryptographic key. An association is recorded between the cryptographic-key number and an electromagnetic tag identifier coupled physically with the key form.

In some such embodiments, the key form identifies the cryptographic-key number, such as with a one-dimensional bar code. Similarly, the cryptographic key may be specified in some instances with a machine-readable code such as a linear or two-dimensional bar code.

The key may be generated with components received from key custodians. For example, a first key component may be received from a first key custodian, and second key component received from a second key custodian, with a key operation being performed on the first and second key components to generate the cryptographic key. The key form may then also identify the first and second key custodians, such as with signatures of the first and second key custodians or with biometric identifications. In some embodiments, the first key custodian is authenticated by reading a first card presented by the first key custodian and by receiving a first PIN input by the first key custodian. Consistency of information read from the first card with the first PIN is verified. Similarly, the second key custodian may be authenticated by reading a second card presented by the second key custodian and receiving a second PIN input by the second key custodian. Consistency of information read from the second card with the second PIN is verified. In some instances, a key manager who authorized the key custodians may be authenticated. A key-manager card presented by the key manager is read and a key-manager PIN input by the key manager is received. Consistency of information read from the key-manager card with the key-manager PIN is verified. In one embodiment, a label to be coupled physically with the key form and specifying the cryptographic-key number is printed. The label may comprise a one-dimensional bar code specifying the cryptographic-key number.

Such methods of the invention may be embodied by a system for generating a cryptographic key. The system comprises a key terminal having an input device and a processor, as well as an output device, a storage device, and a host security module, each coupled with the key terminal. The processor has programming instructions to interact with the input device, the output device, the storage device, and the host security module to implement methods of the invention.

In another set of embodiments, a device is provided for storing a cryptographic key. A key form is held within a receptacle and specifies the cryptographic key. An electromagnetic tag identifier is affixed to the receptacle. A machine-readable cryptographic-key identifier is associated with the electromagnetic tag identifier and identifies the cryptographic key, and is visible from an exterior of the receptacle.

In some such embodiments, the machine-readable cryptographic-key identifier is printed on the key form, with the receptacle comprising a window through which the machine-readable cryptographic-key identifier is visible from the exterior of the receptacle. In other embodiments, the machine-readable cryptographic-key identifier is printed on a label affixed to the exterior of the receptacle; such a label may include a human-readable version of the cryptographic-key identifier. The machine-readable cryptographic-key identifier may comprise a one-dimensional bar code. The key form may include additional information in some embodiments. For example, the key form may include a human-readable version of the cryptographic-key identifier. The key form may also include an identification of key custodians who generated the cryptographic key, and perhaps also an identification of a key manager who authorized the key custodians to generate the cryptographic key. The identification of the key custodians may comprise a biometric identification or may comprise a signature of each of the key custodians in different embodiments. The key form may render the cryptographic key value with a machine-readable code, such as with a linear or two-dimensional bar code.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1A:
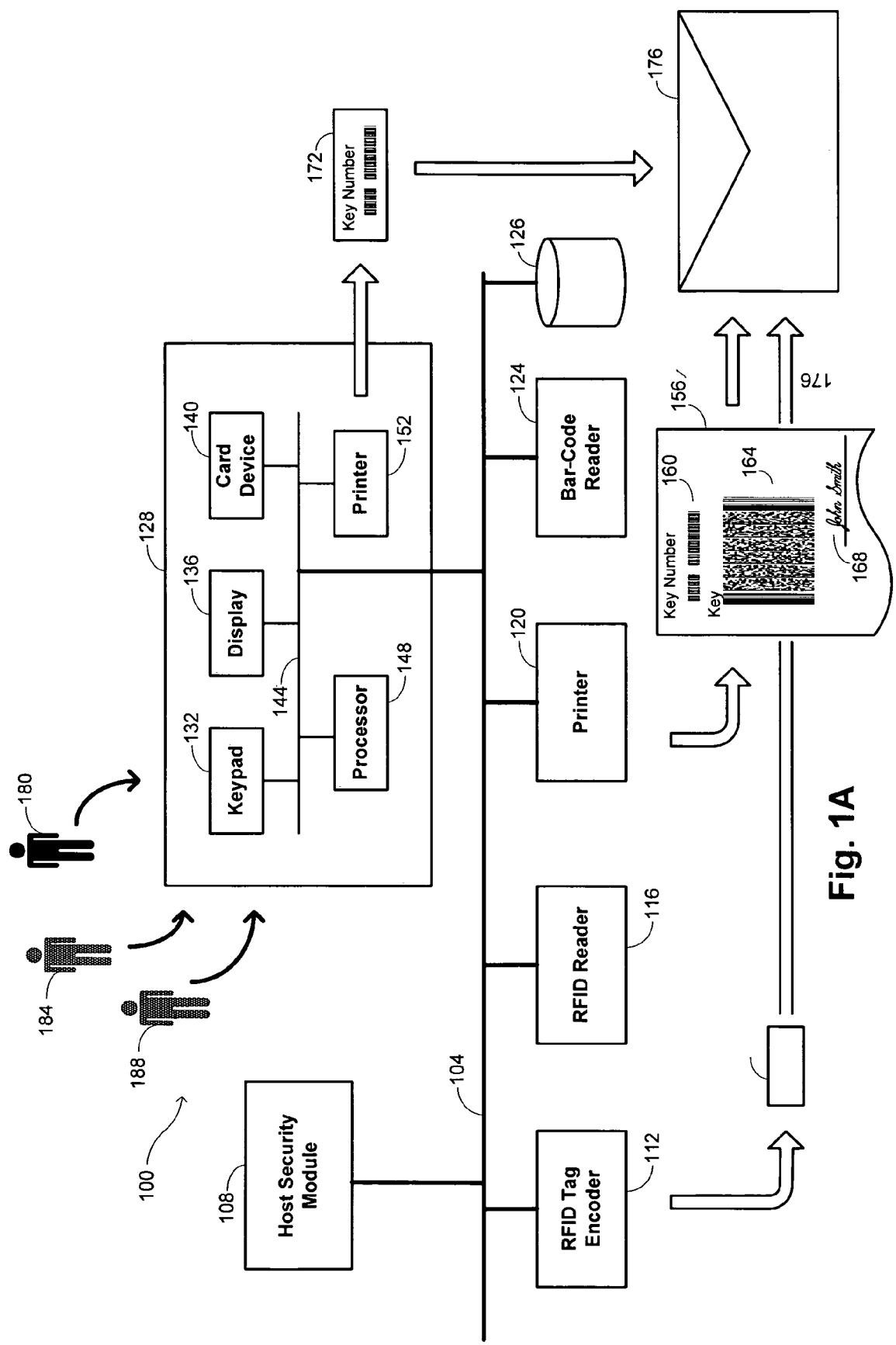
FIG. 1A is a schematic diagram that provides an overview of a system in an embodiment of the invention.

Embodiments of the invention make use of a key terminal that coordinates a number of aspects of the generation and management of cryptographic keys. An overview of the system is provided with the schematic view shown in FIG. 1A. The overall system is designated generally by reference number 100; the specific structure for the system 100 shown in FIG. 1A is intended merely to be exemplary and other configurations may be used without departing from the spirit of the invention. For instance, in the example of FIG. 1A, a number of distinct components are provided and they are connected by a bus 104. In alternative embodiments, the functionality described herein for the individual components may be integrated into a smaller number of components or may be separated among a greater number of components.

The cryptographic functions are coordinated by a host security module 108, which may be of the type known in the art. One example of a suitable host security module 108 is the RG7000 host security module produced by Zaxus as described in its Operations and Installations Manual 1270A513, the entire disclosure of which is incorporated herein by reference for all purposes. During processes for generating cryptographic keys, information is exchanged with the host security module 108 by human operators 180, 184, and 188 who interact with a key terminal 128. The human operators may participate differently in the process by performing different functions. For example, one of the human operators 180 may be a key manager, who has supervisory authority over the process. Usually a plurality of the human operators 184 and 188 function as key custodians, who are involved directly in the key generation. The involvement of a plurality of key custodians 184 and 188 ensures that key access is not entrusted with a single individual, thereby improving the security of the system. This security is enhanced by the involvement of the key manager 180 since the system is usually organized to require the approval of the key manager 180 before a key custodian 184 or 188 may interact with the system.

The structure shown for the key terminal 128 is also exemplary and includes a number of components interfaced with a bus 144. These components include data-input components such as a keypad 132 and a card device 140. The card device 140 may be a magnetic or optical card reader in different embodiments, but is preferably a chip-card device that has the ability not only to read information from a chip on a chip card but also has the ability to write information to the chip. As such, the card device 140 may act as both an input device and as an output device. Other output devices may include a display 136 and a printer 152, the functions of which are described in more detail below. The operation of each of the components and interaction with other components of the system 100 is coordinated by a processor 148, which may be any device having the capability of executing instructions, such a may be provided in software, hardware, and/or firmware implementations.

Figure 1B:
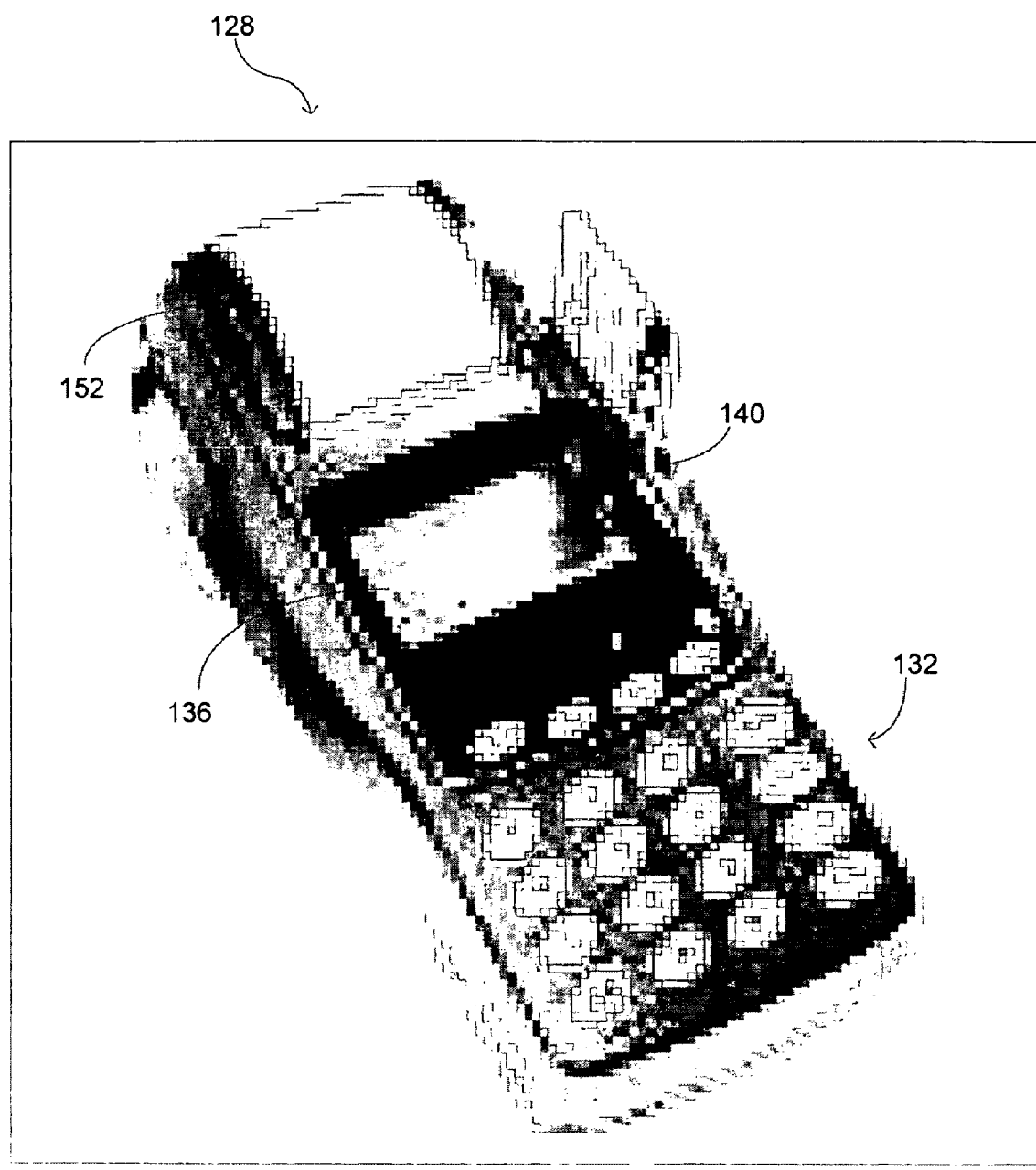
FIG. 1B is a photograph of a key terminal that may be used with the system of FIG. 1A in an embodiment.

FIG. 1B provides a photograph of a key terminal 128 in one embodiment. It this embodiment, the key terminal 128 is conveniently provided as a handheld device. The keypad 132 permits one of the human operators 180, 184, and/or 188 to enter alphanumeric information into the device. In instances where the cryptographic keys are represented as hexadecimal strings, the keypad 132 may advantageously be provided with sixteen keys that correspond to the base characters of the hexadecimal strings. The display 136 may be provided compactly on the device to provide instructions to the human operators and to provide echo confirmation of what the operators input on the keypad 132.

In addition to the printer 152 comprised by the key terminal 128, the system may include an additional printer 120. These printers may be used for different functions. For example, one printer 120 may be used to print out a key form 156 that is inserted into an envelope 176 as part of the process, and the other printer 152 may be used to print out a label 172 that is affixed to the envelope 176. Each of the printers 152 and 120 is preferably a non-impact printer so that there is no persistence of data that might improperly be used to obtain information regarding generated keys; for example, the printers could be ink-jet printers. Information included on the key form 156 may include a key number 160 assigned to the key as part of the key-generation process, the key 164 itself, and a signature of the key custodian 184 or 188. In some embodiments, the key number 160 may be printed as a one-dimensional bar code and the key 164 may be printed as a two-dimensional bar code. A protocol for the generation of two-dimensional bar codes is the PDF417 protocol, which is generally known in the art. A bar-code reader 124 enables the one-dimensional and/or two-dimensional bar codes that are printed by the system to be read. In some instances, the signature of the key custodian 184 or 188 may be substituted with a biometric identification of the key custodian 184 or 188. A storage device 126 permits data to be stored as appropriate in implementing methods of the invention.

In addition to affixing a label 172 on the envelope 176, a radio-frequency identification ("RFID") tag 176 such as encoded by an RFID tag encoder 112 may be affixed to the key form. The RFID tags may be identified by an RFID reader 116.

Figure 2:
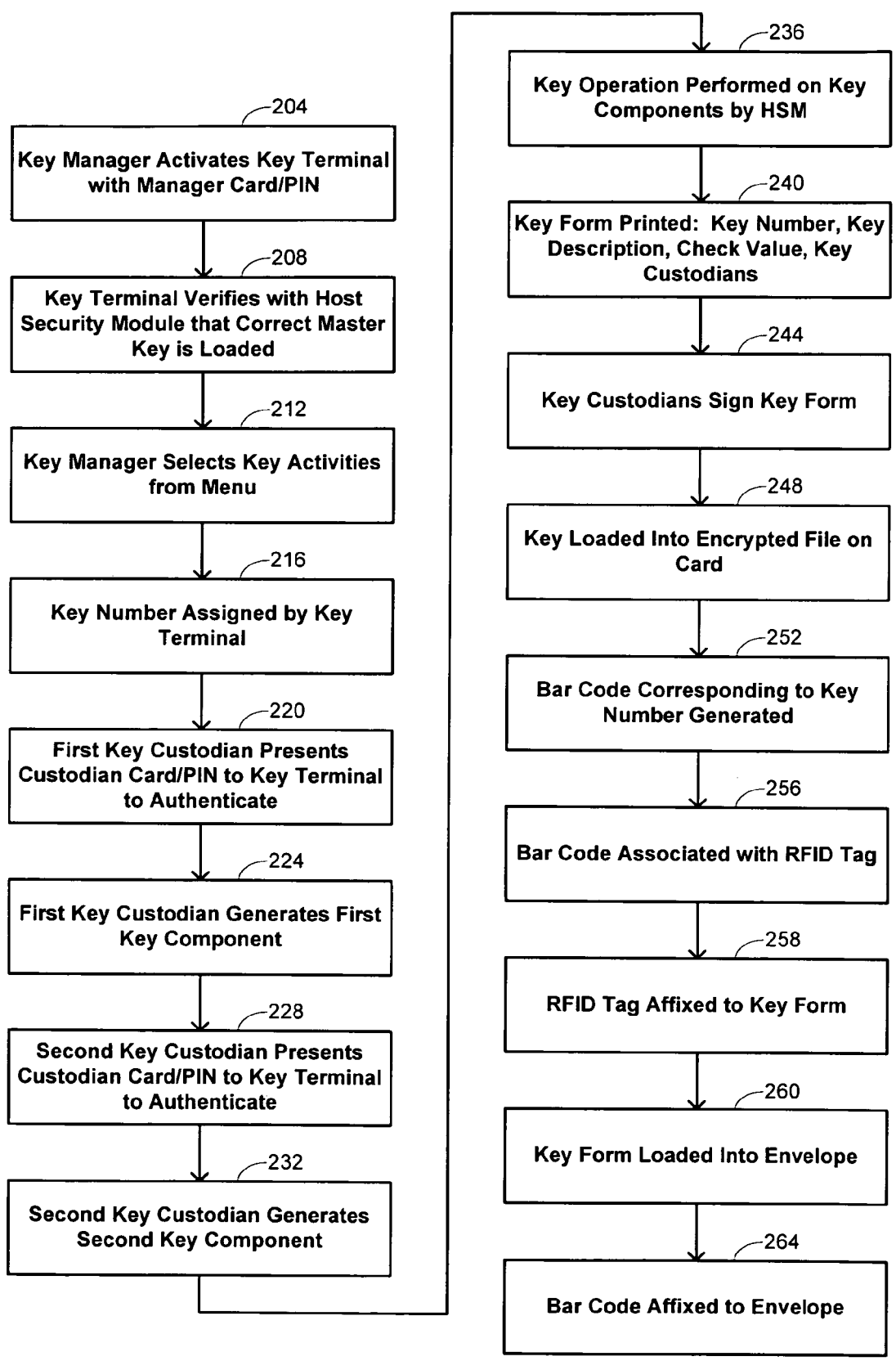
FIG. 2 is a flow diagram that illustrates a method of generating a cryptographic key in an embodiment of the invention.

FIG. 2 provides a flow diagram that illustrates how the system described in connection with FIGS. 1A and 1B may be used in generating a key. At block 204, a key manager 180 activates the key terminal with a key-manager card and by entering a PIN with the keypad 132. Greater security is provided by requiring both the physical presence of a key-manager activation card and entry of a PIN. The key-manager card includes information that allows the key terminal 204 to accept input from key custodians 184 and 188, and identifies both what PIN is required to authenticate the card and what master key to be used in the key generation. The key-manager card may distinguish between test operations, which are used periodically to verify the correct operation of the system, and production operations, which are actual effective implementations. The production operations use "production keys," whose security is especially critical, while the test operations use "test keys," whose security is less critical since no production operations are compromised if the security of a test key is breached. The key terminal 128 verifies at block 208 that the correct master key is loaded in the host security module 108 before beginning to generate a key. Within a hierarchy of cryptographic keys, a "master key" is at a higher level within the hierarchy than a subset of the keys, and may be used to protect the subset of keys. Depending on the hierarchical key structure and the hierarchy level, a master key may comprise a "zone master key," a "local master key," a "grand master key," and the like. Commonly, a master key comprises a double-length Data Encryption Standard ("DES") key, but this is not required and the master key may have a variety of suitable characteristics.

After being authorized by the key terminal 128, the key manager 180 has the ability to perform a number of functions, one of which is to perform key activities, which are initiated by selection of such an option from a menu at block 212. The selection may specify such characteristics as the length of the key. At block 216, a key number is assigned by the key terminal 128 to the key that is to be generated; such a key number may thereafter be used as an identifier that distinguishes the key from other keys. The actual generation of the key is performed by the key custodians, usually by requiring a plurality of key custodians to participate in the process to provide enhanced security. The number of custodians required to be involved may depend on the key characteristics as defined by previous entries. Thus, at block 220, a first key custodian 184 presents a custodian card to be read by the card reader 140 of the key terminal and enters a corresponding PIN on the keypad 132 for authentication with information read from the custodian card. The first key custodian generates a first key component using the key terminal 128 as an interface to the host security module 108 at block 224. Similarly, a second key custodian presents a custodian card and PIN at block 228 to enable the second key custodian to generate a second key component at block 232 in similar fashion. In principle, the same procedure may be repeated with arbitrarily many key custodians, although in practice two or three key custodians provides an acceptable balance between the desire to increase security by involving a plurality of custodians and the desire not to make the process too cumbersome by involving too many individuals.

The key is generated by performing a key operation on the key components with the host security module 108 at block 236. The resulting key form 156 is printed at block 240 and may include information in addition to that shown explicitly in FIG. 1A. The particulars of the information that is included may depend on the type of encryption that is performed, such as whether the encryption is symmetric or asymmetric, whether a block or stream cipher is used, and the like. For example, in one embodiment, the printed key form may include the key number; key material identifying the specific key values; a key check value; master-key information that itself identifies a master-key name, a master-key number, and some or all of the master-key check value; an identification of a type for the key, such as defined by the Racal key scheme; a key index, if applicable; an identification of the key custodian and/or key manager, by name and/or by a numerical identifier; and a designation of whether the key is a test key or a production key. The key custodians and/or key manager may sign the key form as indicated at block 244. In some embodiments, the generation of the physical key form may also be accompanied by loading the generated key onto a card, as indicated at block 248.

The key number is printed as a one-dimensional bar code on a label 172 at block 252, and this bar code is associated with an RFID tag at block 256. The results of this process are assembled at blocks 258 and 260, with the RFID tag being affixed to the key form at block 258 and the printed key form 156 being loaded into the envelope at block 260. At block 264, the key-number bar code is affixed on the envelope. The label 172 that includes the one-dimensional bar code identifying the key number preferably also includes a human-readable identification of the key number, permitting the key manager to verify that the correct key form is being inserted into the correct envelope by comparison of the key numbers printed on the label and on the key form, without revealing the key contents.

Figure 3:
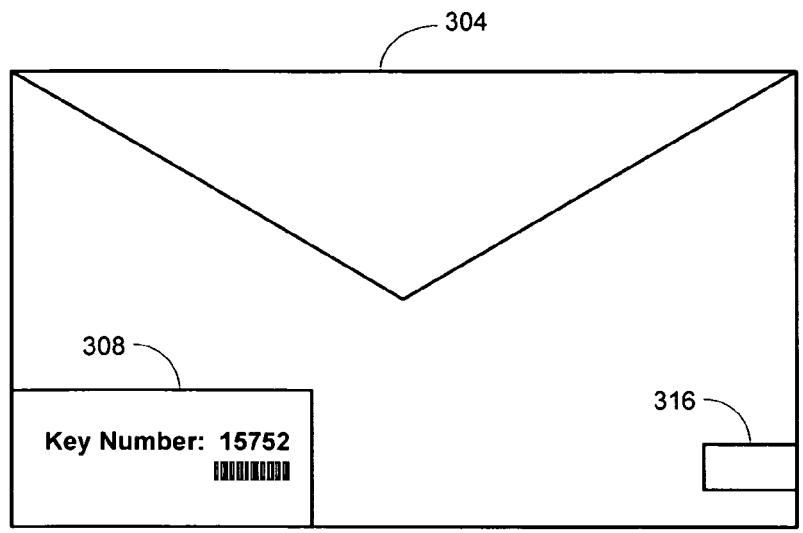
FIG. 3 provides an illustration of an envelope used to hold cryptographic-key forms in an embodiment of the invention.

In some embodiments, the use of the bar-code label 172 may be avoided by using an envelope having a cutout window portion, as illustrated in FIG. 3. In this embodiment, the cutout window portion 308 allows the key number printed on the key form to be seen directly, and for its bar-code portion to be scanned directly, even while the key form is resident within the envelope 308. The RFID tag 316 is affixed to the envelope 304 in the same fashion as described above. This embodiment thus has the further advantage that it avoids the possibility of errors in matching the bar-code label 172 with the key form 156.

Embodiments of the invention thus enable a process in which cryptographic keys are generated and both avoids a number of potential errors with other processes and generally increases the efficiency of key generation. Furthermore, the segregation between production keys and test keys is monitored by the system to prevent commingling of production and test keys, thereby significantly reducing the risk of accidental use of a production key as a test key, a error that would result in compromising the production key.

Figure 4:
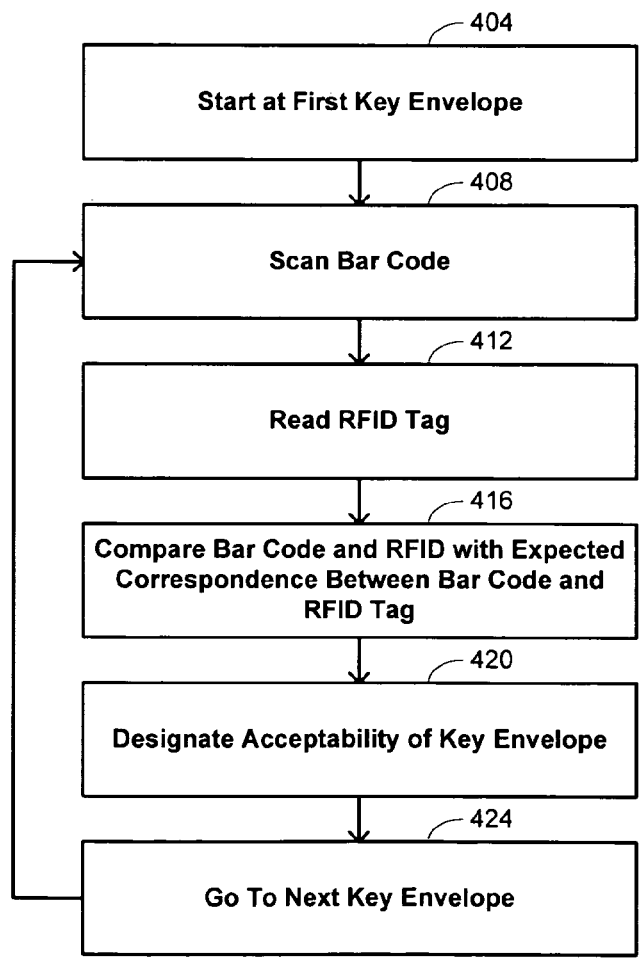
FIG. 4 is a flow diagram illustrating a method of auditing cryptographic keys in an embodiment of the invention.

The resulting collection of key envelopes 176 or 304 also permits more automated key-audit processes to be implemented, reducing substantially the time taken for a key audit. Briefly, a key audit is intended to verify that all of the keys are correctly assigned and stored. A key audit may progress sequentially through a collection of key envelopes, beginning with a first key envelope as indicated at block 404 of FIG. 4. The bar code identifying the key number for the key to be stored in that envelope is scanned at block 408. Such scanning may take place by scanning a label 172 affixed to the envelope or by scanning the bar code through a window in the envelope when the envelope 304 described in connection with FIG. 3 is used. The RFID tag 412 affixed to the key form is also read at block 412, allowing the system to compare the read bar code and RFID tag with the expected correspondence between the bar code and RFID tag at block 416. That is, the system maintains a record which key numbers are associated with which RFID tags, so that the audit fails in the event that the expected association is not confirmed by actual measurements of the envelope. The acceptability or not of the key envelope is thus designated at block 420, such as by using a color-light system with red indicating an audit failure and green indicating an audit pass, or perhaps alternatively by simply recording the bar-code key numbers for those envelopes that fail the audit. The process is repeated by going to the next envelope, as indicated at block 424 until all of the envelopes have been checked.

The inclusion of the RFID tags also conveniently permits key inventory functions to be performed. Such key inventory functions are distinct from the auditing functions and may generally be performed even more quickly than the auditing functions. A set of key envelopes to be audited may simply be scanned electromagnetically to identify which RFID tags are comprised by the set. Each of the RFID tag identifications may then be correlated with keys according to the stored correspondence of RFID tags and key numbers. Such an inventory function may be performed, for example, on a secure filing cabinet that holds a plurality of envelopes that contain the key forms generated as described above. The contents of the cabinet may be inventoried, even though the cabinet may be a locked device constructed with a number of tamper-resistant mechanisms, provided that the cabinet is transparent to the radio-frequency wavelengths used by the RFID devices. While in some instances, such a capability may be viewed as advantageous because it provides a convenient mechanism of inventorying the cabinet contents, it other instances it may be viewed as disadvantageous because of the potential for improper retrieval of the RFID information, in which case the cabinet or room in which the key envelopes are stored may be constructed to be opaque to radio-frequency wavelengths.

Embodiments of the invention may readily be adapted to a variety of different types of key generation. While the above description has described a process in which separate key components are received from separate key custodians so that the key may be generated by performing a key operation on the components, other methods for generating the key may be used in alternative embodiments. For instance, the host security module may be invoked to generate a key where no clear key components are entered manually, with the key being displayed under a local master key. Another possibility is for the key to be generated by the host security module and exported under a zone key that may have been manually entered in clear components. A further possibility is for the host security module to generate a key and export and/or display it under an asymmetric key similar to RSA or ECC type keys. Still another possibility is to have the host security module generate the clear key component, generally used for a zone master key, and display those values in the clear and under the local master key. All of these types of operations, and others, may be automated in accordance with embodiments of the invention in their interaction with the host security module via the key terminal, printing of the values on key forms via machine-readable bar codes, and the like.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of managing a cryptographic key, the method comprising:
    assigning, by a microprocessor-based key terminal, a cryptographic-key number to the cryptographic key;
    printing, from the microprocessor-based key terminal, a key form specifying the cryptographic key;
    recording, by the microprocessor-based key terminal on a storage device, an association between the cryptographic-key number and an electromagnetic tag identifier coupled physically with the key form;
    receiving, by the microprocessor-based key terminal, a first key component from a first key custodian;
    receiving, by the microprocessor-based key terminal, a second key component from a second key custodian;
    performing a key operation on the first and second key components to generate the cryptographic key;
    authenticating, by the microprocessor-based key terminal, the first key custodian by reading a first card presented by the first key custodian, receiving a first personal identification number input by the first key custodian, and verifying consistency of information read from the first card with the first personal identification number;
    authenticating, by the microprocessor-based key terminal, the second key custodian by reading a second card presented by the second key custodian, receiving a second personal identification number input by the second key custodian, and verifying consistency of information read from the second card with the second personal identification number; and
    authenticating, by the microprocessor-based key terminal, a key manager who authorized the key custodians by reading a key-manager card presented by the key manager, receiving a key-manager personal identification number input by the key manager, and verifying consistency of information read from the key-manager card with the key-manager personal identification number.

2. A method for managing a cryptographic key, the method comprising:
    authenticating, by a microprocessor-based key terminal, a key manager by reading a key-manager card presented by the key manager, receiving a key-manager personal identification number input by the key manager, and verifying consistency of information read from the key-manager card with the key-manager personal identification number;
    authenticating, by the microprocessor-based key terminal, a first key custodian authorized by the authenticated key manager by reading a first key-custodian card presented by the first key custodian, receiving a first key-custodian personal identification number input by the first key custodian, and verifying consistency of information read from the first key-custodian card with the first key-custodian personal identification number;
    receiving, by the microprocessor-based key terminal, a first key component from the authenticated first key custodian;
    authenticating, by the microprocessor-based key terminal, a second key custodian authorized by the authenticated key manager by reading a second key-custodian card presented by the second key custodian, receiving a second key-custodian personal identification number input by the second key custodian, and verifying consistency of information read from the second key-custodian card with the second key-custodian personal identification number;
    receiving, by the microprocessor-based key terminal, a second key component from the authenticated second key custodian;
    performing a key operation on the first and second key components to generate the cryptographic key;
    assigning, by the microprocessor-based key terminal, a cryptographic-key number to the cryptographic key;
    printing, from the microprocessor-based key terminal, a key form identifying the cryptographic-key number with a one-dimensional bar code, specifying the cryptographic key with a two-dimensional bar code, and identifying the first and second key custodians; and recording, by the microprocessor-based key terminal on a storage device, an association between the cryptographic-key number and an electromagnetic tag identifier coupled physically with the key form.

3. The method recited in claim 2 further comprising printing a label to be coupled physically with the key form, the label specifying the cryptographic-key number with the one-dimensional bar code.

4. A system for generating a cryptographic key, the system comprising:

a key terminal having an input device and a processor;
    an output device coupled with the key terminal;
    a storage device coupled with the key terminal; and
    a host security module coupled with the key terminal,
    wherein the processor has programming instructions to interact with the input device, the output device, the storage device, and the host security module to:
        assign a cryptographic-key number to the cryptographic key;
        print a key form specifying the cryptographic key with the output device;
        record an association between the cryptographic-key number and an electromagnetic tag identifier coupled physically with the key form on the storage device;
        receive a first key component from a first key custodian with the input device;
        receive a second key component from a second key custodian with the input device; and
        perform a key operation on the first and second key components with the host security module to generate the cryptographic key;
    and wherein the input device comprises a keypad and a card reader; and
    the processor further has programming instructions to:
        authenticate the first key custodian by reading a first card presented by the first key custodian with the card reader, receive a first personal identification number input by the first key custodian with the keypad, and verify consistency of information read from the first card with the first personal identification number;
        authenticate the second key custodian by reading a second card presented by the second key custodian with the card reader, receive a second personal identification number input by the second key custodian with the keypad, and verify consistency of information read from the second card with the second personal identification number; and
        authenticate a key manager who authorized the key custodians by reading a key-manager card presented by the key manager with the card reader, receive a key-manager personal identification number input by the key manager with the keypad, and verify consistency of information read from the key-manager card with the key-manager personal identification number.

* * * * *